US011182181B2

(12) United States Patent
Harrington et al.

(10) Patent No.: US 11,182,181 B2
(45) Date of Patent: Nov. 23, 2021

(54) VIRTUAL ENVIRONMENTS GENERATOR

(71) Applicant: International Business Machines Corporation, Armonk, NY (US)

(72) Inventors: Shaun E. Harrington, Sahuarita, AZ (US); Benjamin K. Rawlins, Tucson, AZ (US); Larry Hogan, Jr., Tucson, AZ (US); Emmanuel Barajas Gonzalez, Guadalajara (MX)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 16/141,765

(22) Filed: Sep. 25, 2018

(65) Prior Publication Data
US 2020/0097307 A1    Mar. 26, 2020

(51) Int. Cl.
*G06F 17/00*    (2019.01)
*G06F 9/455*    (2018.01)
(Continued)

(52) U.S. Cl.
CPC ........ *G06F 9/45504* (2013.01); *G06F 16/245* (2019.01); *H04L 43/0864* (2013.01); *G06F 16/22* (2019.01); *H04L 67/1097* (2013.01)

(58) Field of Classification Search
CPC .................................................. G06F 11/261
(Continued)

(56) References Cited

U.S. PATENT DOCUMENTS 7,251,456 B2 * 7/2007 Chiu ..................... H04W 16/22
455/67.11
7,346,896 B2 * 3/2008 Kounik ................... H04L 43/50
370/252
(Continued)

FOREIGN PATENT DOCUMENTS

WO    2016130526 A1    8/2016
WO    2017112785 A1    6/2017

OTHER PUBLICATIONS

Friston et al., "Measuring Latency in Virtual Environments," University College London, Mar. 2014, pp. 1-10.
(Continued)

*Primary Examiner* — Andy Ho
(74) *Attorney, Agent, or Firm* — Zilka-Kotab, P.C.

(57) ABSTRACT

A computer-implemented method according to one embodiment includes monitoring commands sent from a computer to a remote system and monitoring responses sent by the remote system to the computer in reply to the commands. The computer-implemented method includes determining delays corresponding to amounts of time for the remote system to send the responses to the commands, and storing the commands, information from the responses, and the delays in a database in association with the commands. A computer-implemented method according to another embodiment includes receiving a command from a computer, the command being for execution by a remote system. The computer-implemented method includes searching a database for an entry matching the command. The computer-
(Continued)

implemented method includes selecting response data corresponding to the command and a delay value corresponding to the command, and sending the selected response data to the computer after a time delay corresponding to the delay value.

17 Claims, 7 Drawing Sheets

(51) Int. Cl.
*H04L 12/26* (2006.01)
*G06F 16/245* (2019.01)
*H04L 29/08* (2006.01)
*G06F 16/22* (2019.01)

(58) Field of Classification Search
USPC .......................................................... 703/23
See application file for complete search history.

(56) References Cited

U.S. PATENT DOCUMENTS

| | | | |
|---|---|---|---|
| 7,925,741 B2 * | 4/2011 | Hu | G06F 13/385 |
| | | | 709/224 |
| 8,812,725 B2 | 8/2014 | Kulkarni | |
| 9,176,841 B2 * | 11/2015 | Kansal | G06F 11/3457 |
| 9,256,451 B2 * | 2/2016 | Cooper | G06F 9/455 |
| 9,413,625 B2 | 8/2016 | Le Pallec et al. | |
| 9,509,582 B2 | 11/2016 | Le Pallec et al. | |
| 9,509,736 B2 | 11/2016 | Rhea | |
| 9,509,763 B2 | 11/2016 | Canoy | |
| 9,838,373 B2 * | 12/2017 | Turgeman | G06F 21/55 |
| 9,898,205 B1 | 2/2018 | Kaliannan | |
| 9,918,292 B2 | 3/2018 | Koskela et al. | |
| 10,850,199 B2 * | 12/2020 | Nicolades | A63F 13/60 |
| 2015/0263923 A1 | 9/2015 | Kruglick | |
| 2016/0119169 A1 | 4/2016 | Schober | |
| 2016/0292334 A1 | 10/2016 | Rabinovitch et al. | |
| 2017/0038971 A1 | 2/2017 | Takeuchi et al. | |
| 2017/0038972 A1 | 2/2017 | Nazari et al. | |

OTHER PUBLICATIONS

Cecotti et al., "Time Delay Neural Network with Fourier Transform for Multiple Channel Detection of Steady-State Visual Evoked Potentials for Brain-Computer Interfaces," 16th European Signal Processing Conference (EUSIPCO), Aug. 2008, 5 pages.

Mashima et al., "Artificial Command Delaying for Secure Substation Remote Control: Design and Implementation," IEEE, 2017, pp. 1-12.

Joulani et al., "Online Learning under Delayed Feedback," Proceedings of the 30th International Conference on Machine Learning, 2013, 9 pages.

* cited by examiner

VIRTUAL ENVIRONMENTS GENERATOR

BACKGROUND

The present invention relates to emulating a computer environment and more specifically, this invention relates to generating virtualized environments.

Traditional methods of acquiring familiarity with new technology include working with conventional cloud environments or servers. Virtual environments can be accessed by establishing a remote connection via typical techniques.

SUMMARY

A computer-implemented method according to one embodiment includes monitoring commands sent from a computer to a remote system and monitoring responses sent by the remote system to the computer in reply to the commands. The computer-implemented method also includes determining delays corresponding to amounts of time for the remote system to send the responses to the commands, and storing the commands, information from the responses, and the delays in a database in association with the commands.

A computer-implemented method according to one embodiment includes receiving a command from a computer, the command being for execution by a remote system. The computer-implemented method also includes searching a database for an entry matching the command. The computer-implemented method also includes selecting, from the database, response data corresponding to the command and a delay value corresponding to the command, and sending the selected response data to the computer after a time delay corresponding to the delay value.

A computer program product for generating a virtual computer environment according to one embodiment includes a computer readable storage medium having program instructions embodied therewith. The computer readable storage medium is not a transitory signal per se. The program instructions are executable by a computer to cause the computer to perform a method that includes monitoring, by the computer, commands sent from a first computer to a remote system and monitoring, by the computer, responses sent by the remote system to the first computer in reply to the commands. The method also includes determining, by the computer, delays corresponding to amounts of time for the remote system to send the responses to the commands and storing, by the computer, the commands, information from the responses, and the delays in a database in association with the commands. The method also includes receiving, by the computer, a second command from a second computer, the second command being suitable for execution by the remote system. The method also includes searching, by the computer, the database for an entry matching the second command and selecting, by the computer, from the database, response data corresponding to the second command and a delay value corresponding to the response. The method also includes sending, by the computer, the selected response data to the second computer after a time delay corresponding to the delay value.

Other aspects and embodiments of the present invention will become apparent from the following detailed description, which, when taken in conjunction with the drawings, illustrate by way of example the principles of the invention.

DETAILED DESCRIPTION

Figure 1:
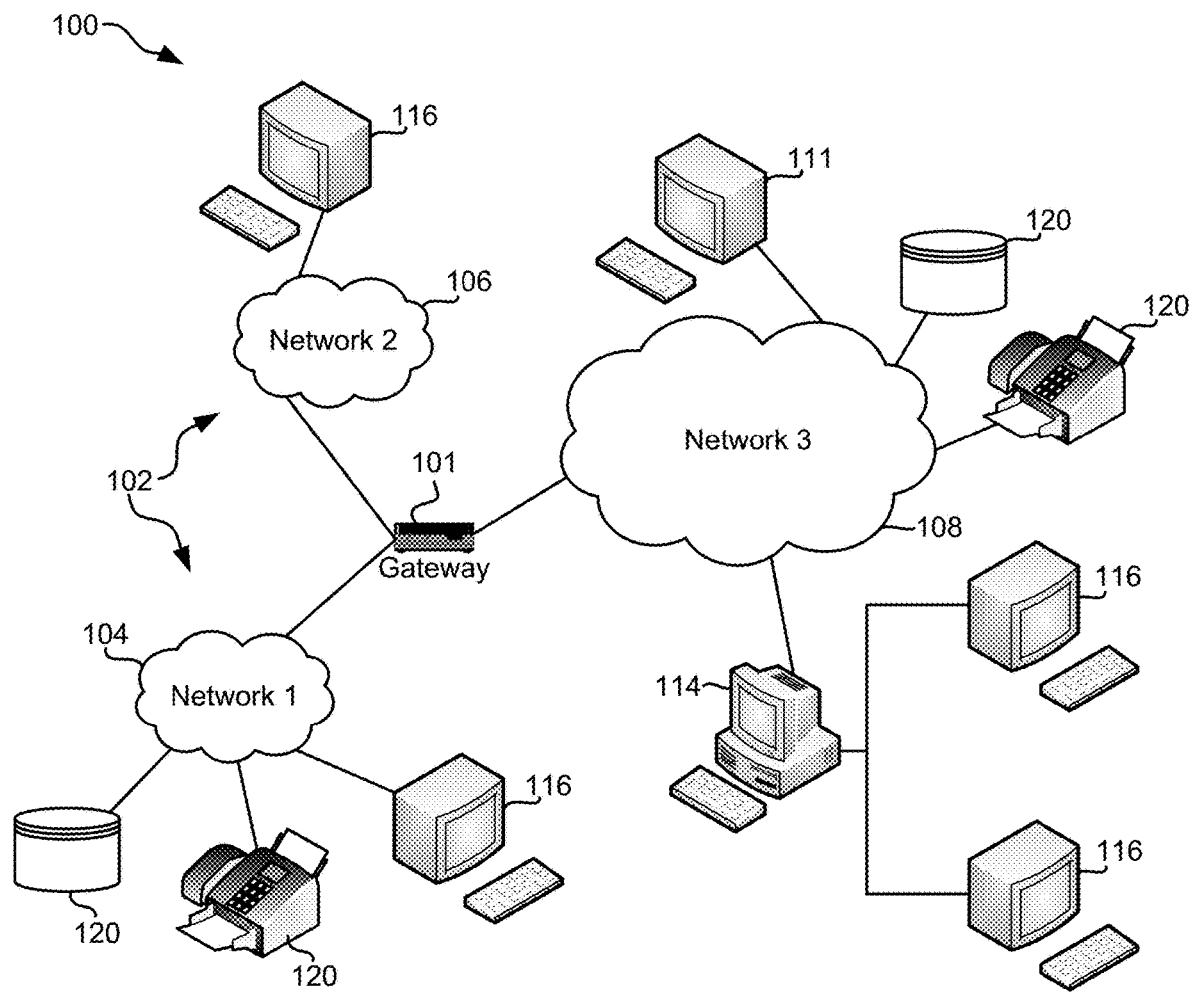
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for a virtual environment generator.

In one general embodiment, a computer-implemented method includes monitoring commands sent from a computer to a remote system and monitoring responses sent by the remote system to the computer in reply to the commands. The computer-implemented method also includes determining delays corresponding to amounts of time for the remote system to send the responses to the commands, and storing the commands, information from the responses, and the delays in a database in association with the commands.

In another general embodiment, a computer-implemented method includes receiving a command from a computer, the command being for execution by a remote system. The computer-implemented method also includes searching a database for an entry matching the command. The computer-implemented method also includes selecting, from the database, response data corresponding to the command and a delay value corresponding to the command, and sending the selected response data to the computer after a time delay corresponding to the delay value.

In yet another general embodiment, a computer program product for generating a virtual computer environment includes a computer readable storage medium having program instructions embodied therewith. The computer readable storage medium is not a transitory signal per se. The program instructions are executable by a computer to cause the computer to perform a method that includes monitoring, by the computer, commands sent from a first computer to a remote system and monitoring, by the computer, responses sent by the remote system to the first computer in reply to the commands. The method also includes determining, by the computer, delays corresponding to amounts of time for the remote system to send the responses to the commands and storing, by the computer, the commands, information from the responses, and the delays in a database in association with the commands. The method also includes receiving, by the computer, a second command from a second computer, the second command being suitable for execution by the remote system. The method also includes searching, by the computer, the database for an entry matching the second command and selecting, by the computer, from the database, response data corresponding to the second command and a delay value corresponding to the response. The method also includes sending, by the computer, the selected response data to the second computer after a time delay corresponding to the delay value.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
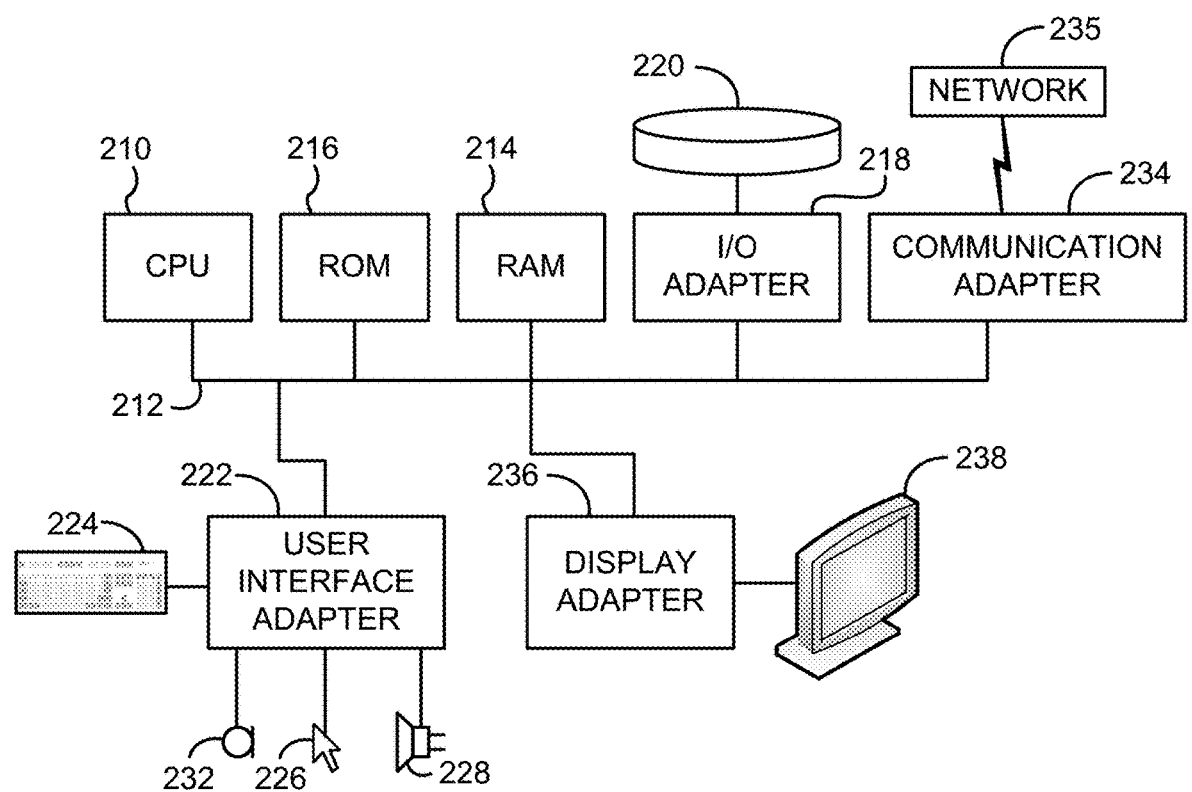
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
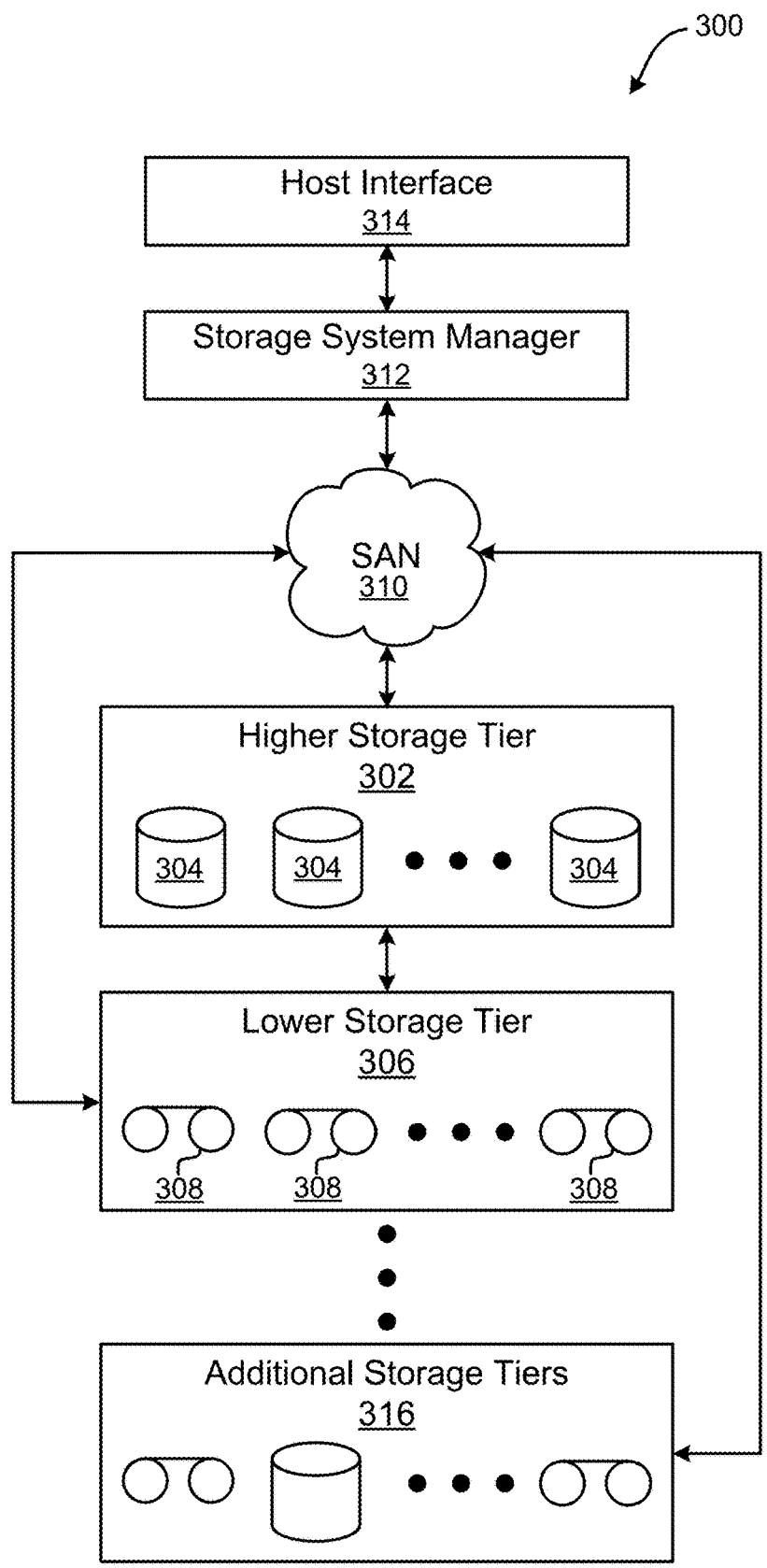
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

The average user may find it difficult to maintain familiarity with the latest technology given the consistent and rapid evolution of modern technology. This may be especially true for users working in fast-paced software development and training environments. Agile methodology changes may occur in a matter of minutes instead of months. Accordingly, users must keep up with the rapid pace of technological advances or risk being left behind.

Traditional methods of becoming familiar and acquainted with new technology are quickly being outpaced by price and scope. For example, learning to work with cloud-based technology is especially difficult. Cloud environments may require entire buildings to operate, and therefore are impractical for singular training. Home powered servers tend to heat a home very quickly, especially when two or more servers are present. Moreover, operating multiple personal computers and/or servers may be too expensive for the average user. Home users are therefore unlikely to experiment with new products and technologies, especially those which involve multiple and/or expensive computing devices such as computers, servers and/or storage systems.

Some embodiments described herein include a methodology of producing new virtualized environments by way of interacting with any given environment. An initial interaction may take place by establishing a remote connection with a system to be emulated via typical techniques. In response to the initial interaction, responses may be triggered from the user interface (UI) by utilizing a repository of typical commands. In response, the responses may be mapped, as well as the meanings of the responses may be interpreted.

Other embodiments described herein include methodology for producing new virtualized environments by way of monitoring interactions between a user computer and any given environment. Interactions taking place are monitored by monitoring a connection between a user computer and a remote computer system, where the connection is effected via typical techniques. Responses to and from the user interface (UI) may be logged and analyzed. Various approaches may map responses as well as interpret the meanings of the responses.

Further embodiments may utilize a combination of the foregoing approaches to map and analyze responses.

In any approach listed above, mapped information and interactions may be interpreted for further discoveries. More importantly, mapped information and interactions may be used to craft a virtually identical UI environment that emulates the target environment. This UI environment may then allow for users to experience interaction with a real environment without the necessity of having or running a virtualized environment.

The system to be emulated may be in remote connection with the user device and/or inventive embodiments via Transmission Control Protocol/Internet Protocol (TCP/IP), File Transfer Protocol (FTP), Telnet, SSH and any other known communication protocol known in the art. Authentication information may also be provided as needed.

Crawling Learning Mode

In some embodiments, a computer assembling the information usable to create a virtualized environment interacts with the system to be emulated to gather such information. The computer may connect to the system to be emulated via any known communication protocol for conducting the interactions. In another approach, the system to be emulated is locally installed on the computer. In yet another approach, the system to be emulated may be locally installed on a device designed for remote connectivity. An exemplary device designed for remote connectivity includes a TS3000 System Console (TSSC).

Once connected, the computer may interact with the system to be emulated by sending predefined commands to the system and monitoring the system's responses. The predefined commands may be retrieved from a repository of typical commands.

Additional useful commands may be identified by way of discovery during the mapping process. For example, the command "Help" would likely generate a multitude of usable commands to map the output of. Templates may also be defined under the assumption that similar environments have similar commands.

Further monitoring and learning may be accomplished by way of monitoring existing connectivity to the device and observing the results.

Monitoring Existing Connectivity

Information about interactions with the system to be emulated may be collected by monitoring existing connections between the device to be emulated and another device. For example, TCP/IP sniffing of devices attached to and/or interacting with the system to be emulated may be performed to gather such information. Known sniffing techniques may be used.

Information produced for output via graphical devices may also be monitored and captured, e.g., for later output during an emulation. Graphical devices may include computer displays, printers, etc. Outputs for such devices may include display information, printer data, etc. Inputs received by devices may be monitored as well. Such devices may include keyboards, mice, trackballs, joysticks, touchscreens, etc.

In some approaches, natural language processing may be used to derive further value and meaning from observations of commands leaving a user terminal and from observations of the remote system responses to those commands.

Create Emulation

Using the information gathered by interacting directly with the system to be emulated and/or captured by monitoring existing connectivity, an emulator may be trained to "replay" and respond as if the real system is responding. For example, recorded commands leaving a user terminal and how the remote system responds to those commands may be used to train the emulator. The remote system responses may include delays, data frames, responses to complex database queries, sending a webpage, etc.

The emulator preferably creates a nearly identical experience to the operation of the remote system by emulating system responses using recorded outputs and introducing typical delays for responding to particular commands. The virtualized environment is ideally substantially akin to the original system in look, feel and scope.

The input and output responses may be monitored and interpreted to identify causes and effects that occur within the environment. An example of this may be when a Transmission Control Protocol/Internet Protocol (TCP/IP) packet type "X" is transmitted to the environment and the environment responds with "Hello World." The emulated virtualized environment of the system may be able to provide the same response.

Some of the inventive embodiments may monitor or "listen" to communications between a user computer and a remote system in a network while the user computer interacts with the remote system. This monitoring or listening enables learning about which commands a user computer is sending and how the remote system is responding to those commands.

A remote system may be any system that a user computer can interact with via a remote connection such as a network of any type. Illustrative remote systems include servers, storage area networks, cloud systems, etc.

Additional embodiments may be able to identify the key functionality and portions of the emulated system that are of value to the user. This may be accomplished through observations of how users interact with the emulated system and the text and/or visuals that are displayed in response to the interactions. Further identification of key functionality may be done via local and/or remote connectivity to determine possible appropriate responses that the user computer may receive.

User interaction may be continuously monitored for as long as the user allows. Some of the inventive embodiments described herein may continue to identify key functionality and value through usage.

Screen outputs may additionally be recorded and modeled in order to provide a substantially identical experience for the emulated virtualized environment.

Some of the embodiments described herein may generate a virtualized environment. This virtualized environment may be continuously enhanced via continued learning and interpretation through usage. The virtualized environment provided to the user computer may be used for testing, training, and additional opportunities with a vastly diminished hardware requirement. The diminished hardware requirement may be accomplished by using only the hardware requirements necessary to show the user what may be seen in the emulated system. These hardware requirements are typically much less than the hardware requirements for actually performing the functions of the system and storing the relevant data.

An example of this approach is a graphical user interface (GUI) that is used to manage a storage system. The emulated system may generate an emulator to which the GUI is able to connect and interact with as if the GUI was managing a real storage system. The emulator in this example uses considerably less hardware than the real storage system.

Figure 4:
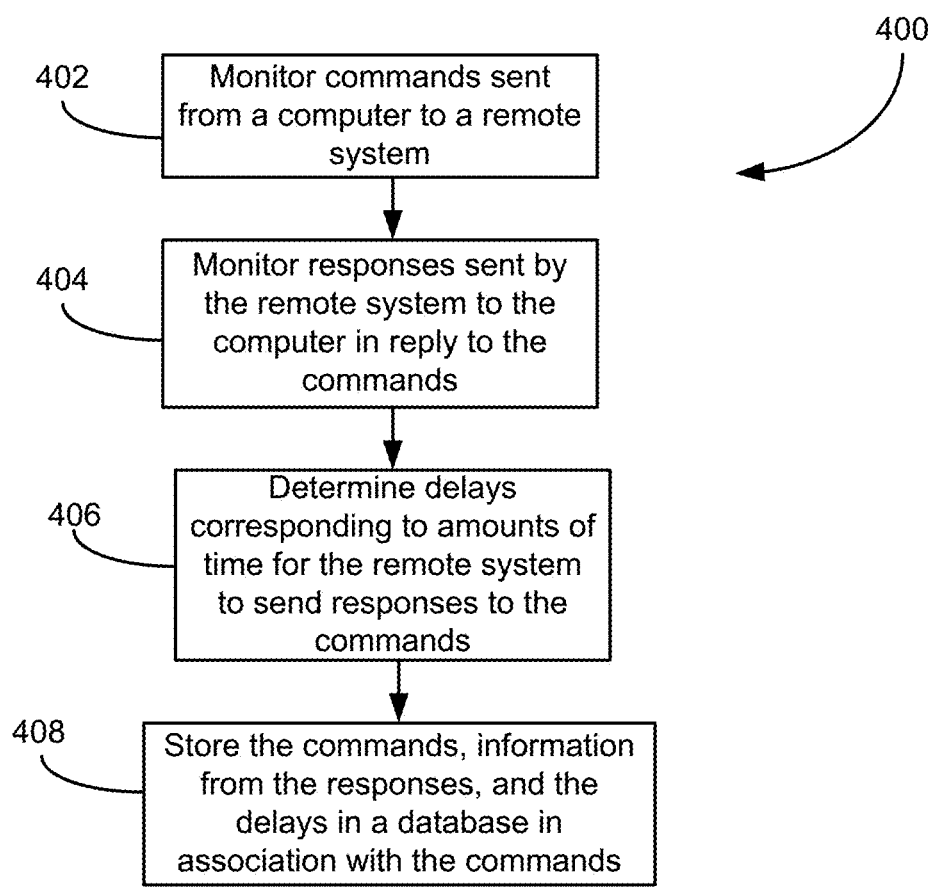
FIG. 4 illustrates a flowchart of a method, in accordance with one embodiment.

Now referring to FIG. 4, a flowchart of a method 400 is shown according to one embodiment. The method 400 may be performed in accordance with the present invention in any of the environments depicted in FIGS. 1-3 and 5-8, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where the computer-implemented method comprises monitoring commands sent from a computer to a remote system. In some approaches the monitoring of commands sent from a computer to a remote system may be via a crawling learning mode. The monitoring of commands from a computer to a remote system in a network may be done by looking at a network protocol level. In various approaches, the monitoring may be through sniffing the protocol and parsing different parts of the protocol to identify which command is being sent from the computer to the remote system.

Operation 404 of method 400 includes monitoring responses sent by the remote system to the computer in reply to the commands. Again, conventional sniffing may be used for the monitoring. In one approach, the monitoring may also include recording the amount of time that the remote system takes to respond for that particular command. In another approach, the monitoring may additionally record what types of responses the user computer is receiving from the remote system. In further approaches, the monitoring may record the typical response time, the type of response, and/or the content of the response. In some approaches, monitoring may perform screen captures.

Operation 406 includes determining delays corresponding to amounts of time for the remote system to send the responses to the commands. The delay value may be measured by various approaches. In one approach, the delay value may be the average amount of time the remote system took to send responses to the commands. In another approach, the delay may be associated with a particular type of response and/or with the particular content of the response. The actual delay corresponding to the delay value may be associated with the complexity of response required by the system. Complexity may be based on how much data is required to provide the response to the command and/or whether or not additional information is needed before the remote system may be able to send a response to the command. In various approaches, determining the delay to apply to commands may include recording the amount of time the remote system took to execute each command and eliminate possible outliers. The delay corresponding to commands may be applied as appropriate to make the emulator experience substantially similar to the emulated system.

Operation 408 includes storing the commands, information from the responses, and the delays in a database in association with the commands. In various approaches, this operation may equivalently store information derived from the responses. In various approaches, the type and/or the content of commands, the type and/or the content of responses, and/or the delays associated with any combination of the type and/or the content of the responses and/or commands may be stored in a database.

In one illustrative approach, screen outputs associated with at least some of the responses are captured and stored in association with the commands that resulted in the screen outputs. This way, when the same command is provided to the emulator, the resulting screen output can be replicated and sent to the user's computer. In various approaches, the screen captures may be taken in response to particular types and/or the content of commands and/or responses. The screen captures may also be captured at random and/or periodic time intervals.

In another illustrative approach, screen outputs associated with at least some of the responses are captured, and a model is generated based on the captured screen outputs. The models are then stored in association with the commands. The model based on the screen outputs may associate screen outputs with the type and/or content of commands, the type and/or the content of responses, and/or the delays associated with any combination of the type and/or the content of the responses and/or commands, any or all of which may be stored in a database.

In yet another illustrative approach, a network protocol of the responses is determined, and metadata associated with the network protocol is removed from the responses for creating the information from the responses. The network protocol may be determined by a network protocol parser capable of parsing different parts of the protocol to identify commands, responses, and/or delays associated with each. Additionally, the network protocol parser may be capable of extracting the important data from the network that is relevant to the communication while removing metadata associated with known protocol methods.

Any combination of the above operations 402-408 may be used to build a database.

Figure 5:
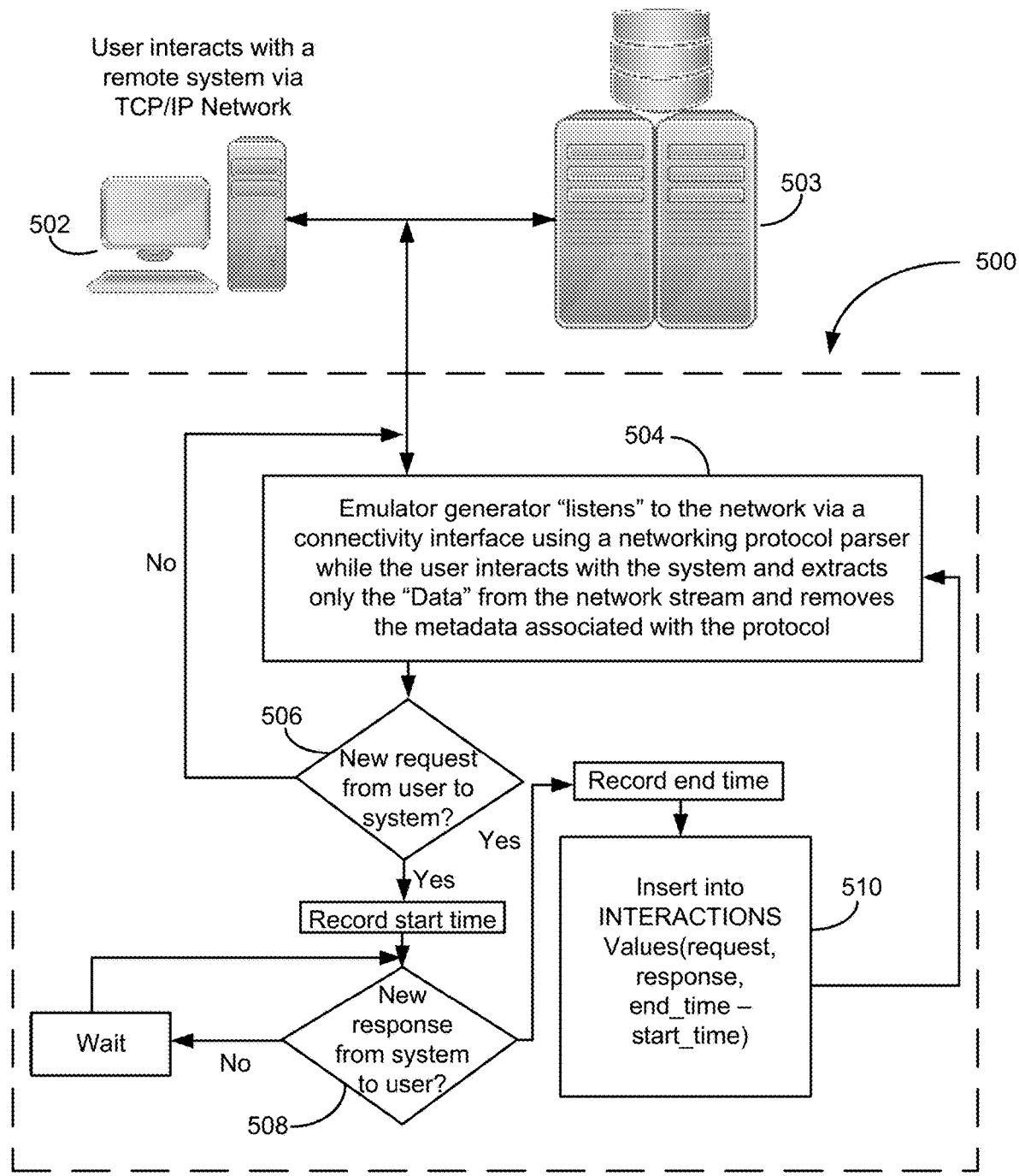
FIG. 5 illustrates a hybrid depiction of an emulator generator and process steps performed thereby, in accordance with one embodiment.

Now referring to FIG. 5, a hybrid depiction of an emulator generator 500 and process steps performed thereby, is shown according to one embodiment. The emulator generator 500 may be used in conjunction with any of the environments depicted in FIGS. 1-4 and 6-8, among others, in various embodiments. Of course, more or less operations than those specifically described in FIG. 5 may be included in process, as would be understood by one of skill in the art upon reading the present descriptions.

Each of the steps of the process may be performed by any suitable component of the operating environment. For example, in various embodiments, the process may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the process. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, an emulator generator 500 is used to gather the information usable to generate a virtualized environment. Shown within the emulator generator 500 is a process performed thereby to build a database for an emulator.

The process may initiate with operation 504, where the emulator generator 500 "listens" to (monitors) a network via a connectivity interface of a type known in the art. Techniques for monitoring the network, such as those discussed above, e.g., sniffing, may be used. The emulator generator 500 may additionally use a network protocol parser to extract only the "data" from the network stream. The process performed by the emulator generator 500 preferably removes the metadata associated with the protocol.

The emulator generator may monitor communications between a user computer 502 and a remote system 503 communication via a network. This monitoring enables learning which commands a user computer is sending and how the remote system is responding to those commands. The process also records the amount of time that the remote system takes to respond to a particular command. The process may additionally record what kind of response the user computer 502 receives from the remote system 503.

In one approach, the network may comprise a connection between the user computer 502 interacting with the remote system 503. An illustrative network is a Transmission Control Protocol/Internet Protocol (TCP/IP) network, though any other type of network may be monitored. The process may include sniffing the TCP/IP protocol and parsing different parts of the protocol to identify commands being sent from the user computer 502 to the remote system 503.

The information monitored on the network may be a website, program, and/or any interaction between the user computer 502 to the remote system 503. The remote system 503 may include one or more servers.

In one approach, the emulator generator runs at a remote site with access to the network. In another approach, the emulator generator may be run locally, e.g., on the user computer 502, on the remote system 503, on a component of the network between the user computer 502 and the remote system 503, etc.

In one embodiment, the emulator generator 500 extracts only the important data from the network stream and removes the metadata associated with the protocol using a networking protocol parser. Important data may be the data that is needed to provide an accurate emulation of the remote system 503. The network protocol parser may be able to extract the most valuable parts from a set of known network protocols including common protocol methods and/or the networking communication. The important aspects of the networking communication may include particular commands and/or responses.

Operation 506 of the process performed by the emulator generator 500 includes a decision that determines if there is a new request from the user computer to the system. A request may be a particular command from a list and/or request from a directory depending on the application a user computer is working with. The request may be from text based applications and/or graphical applications. If yes, the emulator generator 500 records the time the new request was received. The emulator generator 500 may also record the time when the remote system responds to the new request. If no, the emulator generator 500 continues to listen to the network for new requests from the user computer to the system.

Operation 508 of the process performed by the emulator generator 500 includes another decision that determines if there is a new response from the system to the user, e.g., in response to the user computer request detected in operation 506. If yes, the emulator generator 500 records the end time of the request/response sequence. If no, the emulator generator 500 waits until there is a new response from the system to the user.

Operation 510 of the process performed by the emulator generator 500 includes recording request and/or response times to a database. The recordings may form a table in a database. The recordings may include interaction data and related values such as the type of request, the type of response to the request, the time the request was received, the time to respond to the request, the start time, the end time, and/or any other times associated with the length of the interaction.

In some approaches, a parallel execution flow may exist for capturing a screen of the user computer 502. Capturing a screen may be relevant depending on the type of application, commands, and/or responses executed in the process. Screen captures may be associated with particular commands to provide greater depth of interaction. Screen captures may be used to further emulate real world screen captures. This enhances the learning capabilities of the user computer of the system. The screen captures may additionally be recorded in the database. The screen captures may be stored and used to create realistic system experiences for the virtualization environment.

In response to recording request and/or response times to a database, the process performed by the emulator generator 500 loops back to operation 504 and continues to listen to the network for new requests from the user computer via a connectivity interface of a type known in the art.

Figure 6:
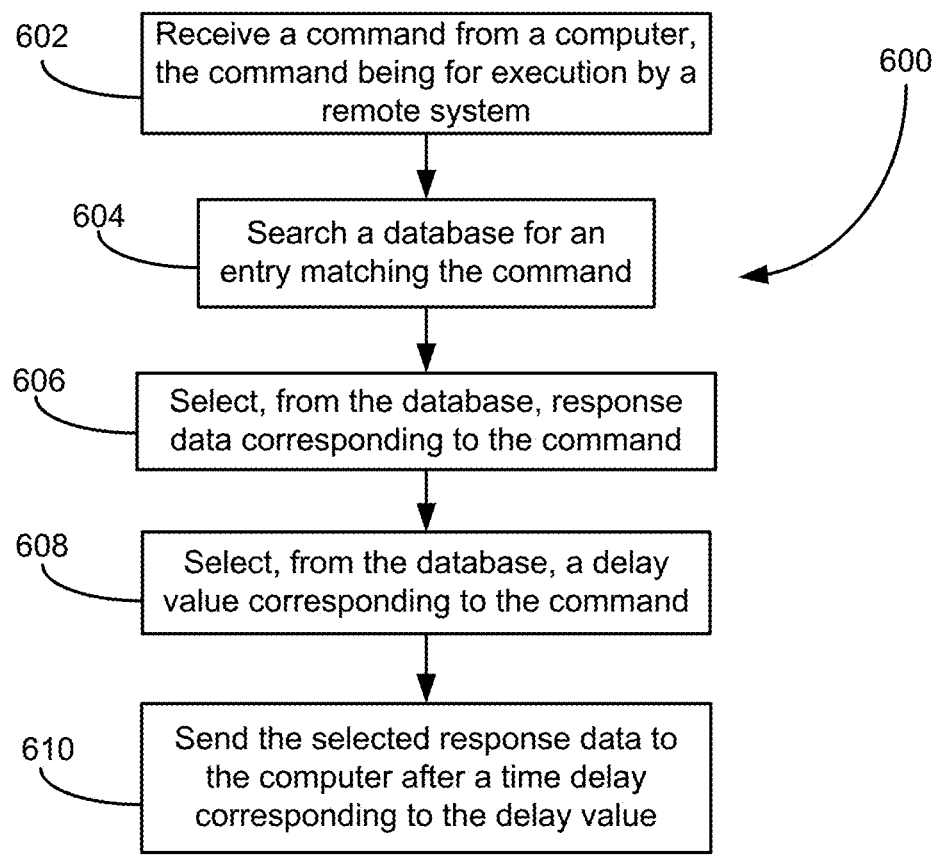
FIG. 6 illustrates a flowchart of a method, in accordance with one embodiment.

Now referring to FIG. 6, a flowchart of a method 600 for emulating interaction with a remote system is shown according to one embodiment. The method 600 may be performed in accordance with the present invention in any of the environments depicted in FIGS. 1-5 and 7-8, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where the method comprises receiving a command from a computer, the command being for execution by a remote system. The command may be received by a second computer running an emulator, the computer from which the command is issued (e.g., the emulator is running on a user computer), etc. In an illustrative approach, an environment generator is initiated. The environment generator generates the virtualized environment within which the method 600 is performed.

Operation 604 of method 600 includes searching a database for an entry matching the command. An entry matching the command may be identical, close, and/or related. The database may be comprised of information gathered via an emulator generator such as the emulator generator described above. In one approach, the database may comprise a repository of typical commands and/or a predefined set of responses.

Operation 606 of method 600 includes selecting, from the database, response data corresponding to the command. The response data corresponding to the command may include the average time for that response, the delay value associated with that response, the content of the response, and/or other information associated with the response. The data corresponding to the command may be selected based on templates for similar functions. Similar functions may have similar commands. The method may infer that a similar response is a proper response. The data selected may be based on a typical command.

In one illustrative approach, a screen output is selected from the database for use as response data. The screen output may include captured screen output. The screen captures in the database may have been taken in response to particular types and/or the content of commands and/or responses, may have been captured at random and/or periodic time intervals, etc.

In another approach, the screen output may include a model derived from a captured screen output based on the received command. A model based on the screen outputs may have been generated and stored in the database. The model based on the screen outputs may be associated, in the database, with the type and/or the content of commands, the type and/or the content of responses, and the delays associated with any combination of the type and/or the content of the responses and/or commands.

Delays corresponding to various commands may be applied as appropriate to make the emulator experience substantially similar to the emulated system. Operation 608 of method 600 includes selecting, from the database, a delay value corresponding to the command. The delay value may have been measured by various approaches. In one approach, the delay value may be the average amount of time the remote system took to send responses to the commands. In another approach, the delay value may be associated with a particular type of response and/or with the particular content of the response. The actual delay corresponding to the delay value may be associated with the complexity of response prepared by the remote system. Complexity may be based on how much data is required to provide the response to the command and/or whether or not additional information is needed before the remote system may be able to send a response to the command.

Operation 610 of method 600 includes sending the selected response data to the computer after a time delay corresponding to the selected delay value. In one illustrative approach, sending the selected response data to the computer includes generating a message that includes the response data and other information corresponding to a communication link with the computer.

Figure 7:
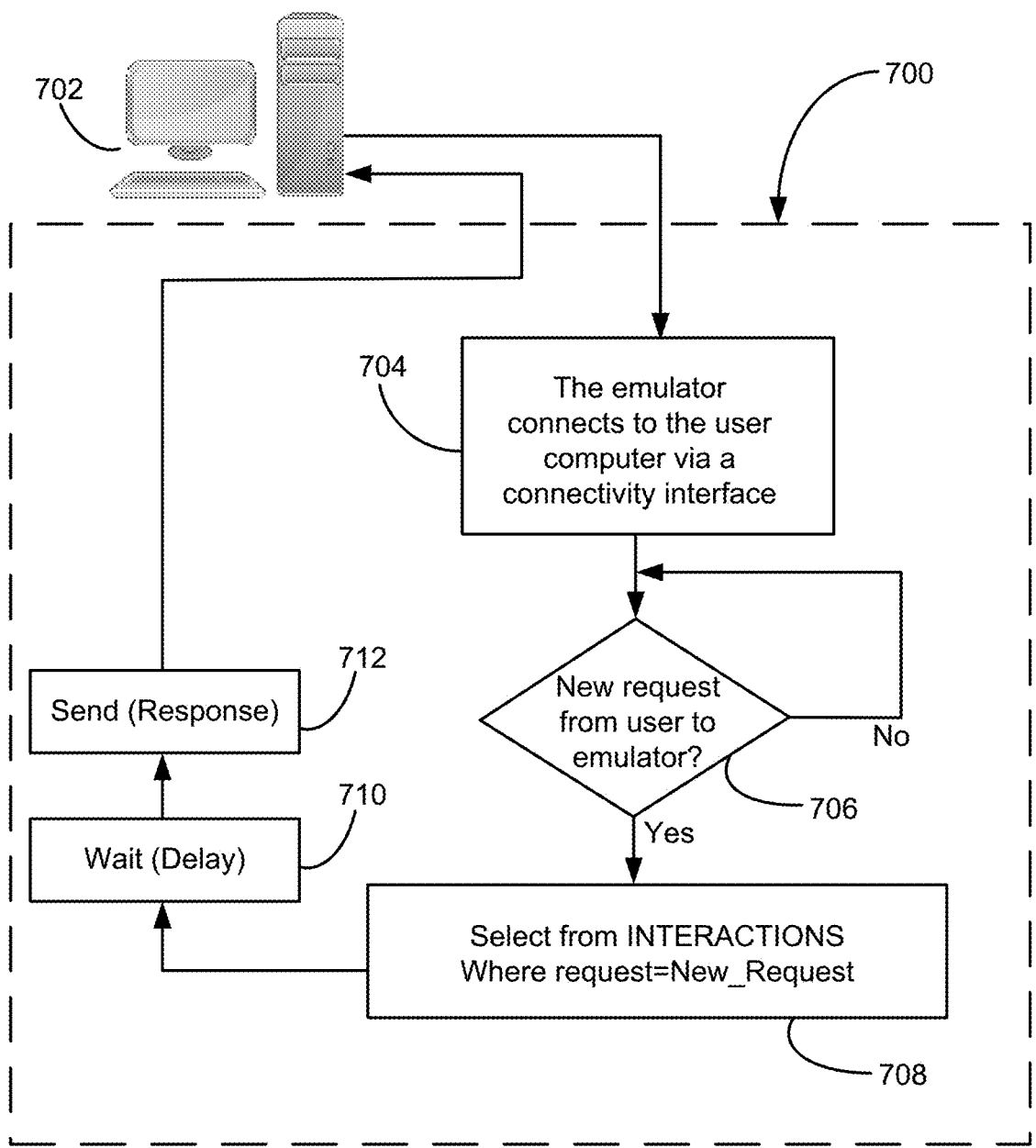
FIG. 7 illustrates a hybrid depiction of an emulator and process steps performed thereby, in accordance with one embodiment.

Now referring to FIG. 7, a hybrid depiction of an emulator 700 and process steps performed thereby, is shown according to one embodiment. The emulator 700 may be used in conjunction with any of the environments depicted in FIGS. 1-6 and 8, among others, in various embodiments. Of course, more or less operations than those specifically described in FIG. 7 may be included in process, as would be understood by one of skill in the art upon reading the present descriptions.

Each of the steps of the process may be performed by any suitable component of the operating environment. For example, in various embodiments, the process may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the process. Illustrative processors include, but are not limited to, a central processing unit (CPU), an application specific integrated circuit (ASIC), a field programmable gate array (FPGA), etc., combinations thereof, or any other suitable computing device known in the art.

In various embodiments of the emulator, the emulator may run on a remote computer coupled to the user computer 702, may run on the user computer 702, etc.

For purposes of the present description, assume the emulator 700 is running on a separate computer. The process performed by the emulator 700 may initiate with operation 704, where the emulator 700 connects to the user computer 702 through a connectivity interface of a type known in the art. In one approach, the emulator 700 may be connected to the user computer 702 through any type of network, including a LAN, a WAN, etc. In another approach, the connection may be made to an external computer (for example, through the Internet using an Internet Service Provider). For example, the connectivity interface may be associated with an IP address.

Operation 706 of the process performed by the emulator 700 includes a decision that determines if there is a new request from the user computer 702 to the emulator 700. A request may be a particular command from a list and/or request from a directory depending on the application a user computer is working with. The request may be from text based applications and/or graphical applications. If yes, the emulator 700 proceeds to operation 708. If no, the emulator 700 continues to monitor for new requests from the user computer 702 to the emulator 700.

Operation 708 of the process performed by the emulator 700 includes selecting data corresponding to the request (command) from the user computer 702 to the emulator 700. The data may be selected by searching a database for an entry matching the request. The match may be identical, close, and/or related. The database may be comprised of information gathered via an environment emulator generator such as the emulator generator described above. In one approach, the database may comprise a repository of typical and/or predefined commands in association with responses that an actual remote system would return in response to the request. In exemplary approaches, the response data corresponding to the command may include the average time for that response, the delay value associated with that response, the content of the response, and/or other information associated with the response. The data corresponding to the command may be selected based on templates for similar functions. Similar functions may have similar commands.

Operation 710 of the process performed by the emulator 700 includes waiting for a predetermined amount of time corresponding to the delay value associated with the request and/or response.

Operation 712 includes sending the selected response data, after the selected time corresponding to the delay value, to user computer 702. In one approach, the emulator 700 may build a message which is suitable for the protocol being used and adds the necessary data.

In response to sending the response data, the process performed by the emulator 700 may loop back to operation 706 and the emulator 700 continues to perform the emulation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    monitoring commands sent from a computer to a remote system;
    monitoring responses sent by the remote system to the computer in reply to the commands;
    determining delays corresponding to amounts of time for the remote system to send the responses to the commands;

storing the commands, information from the responses, and the delays in a database in association with the commands; and capturing screen outputs associated with at least some of the responses, and storing the screen outputs in association with the commands.

2. The computer-implemented method of claim 1, comprising capturing screen outputs associated with at least some of the responses, generating a model based on the screen outputs, and storing the models in association with the commands.

3. The computer-implemented method of claim 1, comprising determining a network protocol of the responses; and removing metadata associated with the network protocol from the responses for creating the information from the responses.

4. A computer-implemented method, comprising:

receiving a command from a computer, the command being for execution by a remote system;

searching a database for an entry matching the command;

selecting, from the database, response data corresponding to the command;

selecting, from the database, a delay value corresponding to the command; and sending the selected response data to the computer after a time delay corresponding to the delay value.

5. The computer-implemented method of claim 4, comprising initiating an environment generator.

6. The computer-implemented method of claim 4, comprising selecting, based on the received command, a screen output selected from the group consisting of a captured screen output and a model derived from a captured screen output.

7. The computer-implemented method of claim 4, wherein sending the selected response data to the computer includes generating a message that includes the response data and other information corresponding to a communication link with the computer.

8. The computer-implemented method of claim 4, comprising building the database by:

monitoring commands sent from a second computer to a remote system;

monitoring responses sent by the remote system to the computer in reply to the commands sent from the second computer;

determining delays corresponding to amounts of time for the remote system to send the responses to the commands; and storing the commands, information from the responses, and the delays in the database in association with the commands.

9. The computer-implemented method of claim 8, comprising capturing screen outputs associated with at least some of the responses, and storing the screen outputs in association with the commands.

10. The computer-implemented method of claim 8, comprising capturing screen outputs associated with at least some of the responses, generating a model based on the screen outputs, and storing the models in association with the commands.

11. The computer-implemented method of claim 8, comprising determining a network protocol of the responses; and removing metadata associated with the network protocol from the responses for creating the information from the responses.

12. A computer program product for generating a virtual computer environment, the computer program product comprising a computer readable storage medium having program instructions embodied therewith, wherein the computer readable storage medium is not a transitory signal per se, the program instructions executable by a computer to cause the computer to perform a method comprising:

monitoring, by the computer, commands sent from a first computer to a remote system;

monitoring, by the computer, responses sent by the remote system to the first computer in reply to the commands;

determining, by the computer, delays corresponding to amounts of time for the remote system to send the responses to the commands;

storing, by the computer, the commands, information from the responses, and the delays in a database in association with the commands;

receiving, by the computer, a second command from a second computer, the second command being suitable for execution by the remote system;

searching, by the computer, the database for an entry matching the second command;

selecting, by the computer, from the database, response data corresponding to the second command;

selecting, by the computer, from the database, a delay value corresponding to the response; and sending, by the computer, the selected response data to the second computer after a time delay corresponding to the delay value.

13. The computer program product of claim 12, comprising capturing screen outputs associated with at least some of the responses, and storing the screen outputs in the database in association with the commands.

14. The computer program product of claim 12, comprising capturing screen outputs associated with at least some of the responses, generating a model based on the screen outputs, and storing the models in the database in association with the commands.

15. The computer program product of claim 12, comprising determining a network protocol of the responses; and removing metadata associated with the network protocol from the responses for creating the information from the responses.

16. The computer program product of claim 12, comprising selecting, based on the received second command, a screen output from the database, the screen output being selected from the group consisting of a captured screen output and a model derived from a captured screen output.

17. The computer program product of claim 12, wherein sending the selected response data to the second computer includes generating a message that includes the response data and other information corresponding to a communication link with the second computer.

\* \* \* \* \*